(12) United States Patent
Hsiao

(10) Patent No.: US 6,776,653 B1
(45) Date of Patent: Aug. 17, 2004

(54) 5-IN-1 CONNECTOR

(75) Inventor: Wen-Hsiang Hsiao, Taipei (TW)

(73) Assignee: WEM Technology Inc., Taipei (TW)

( * ) Notice: Subject to any disclaimer, the term of this patent is extended or adjusted under 35 U.S.C. 154(b) by 0 days.

(21) Appl. No.: 10/663,738

(22) Filed: Sep. 17, 2003

(51) Int. Cl.⁷ ............................................. H01R 13/66
(52) U.S. Cl. ................................... 439/541.5; 434/630
(58) Field of Search .............................. 439/541.5, 630, 439/631, 64, 61, 632, 945, 946, 634, 635, 639, 62; 361/737

(56) References Cited

U.S. PATENT DOCUMENTS

| | | | | |
|---|---|---|---|---|
| 5,933,328 A | * | 8/1999 | Wallace et al. ............. | 361/737 |
| 6,097,605 A | * | 8/2000 | Klatt et al. .................. | 361/737 |
| 6,250,965 B1 | * | 6/2001 | Neifer ......................... | 439/630 |
| 6,386,920 B1 | * | 5/2002 | Sun ............................. | 439/630 |
| 6,402,529 B2 | * | 6/2002 | Saito et al. ................... | 439/74 |
| 6,468,101 B2 | * | 10/2002 | Suzuki ........................ | 439/326 |
| 6,471,550 B2 | * | 10/2002 | Maiterth et al. ............ | 439/631 |
| 6,482,029 B2 | * | 11/2002 | Nishimura ............... | 439/541.5 |
| 6,524,137 B1 | * | 2/2003 | Liu et al. ..................... | 439/638 |
| 6,540,523 B1 | * | 4/2003 | Kung et al. ................... | 439/64 |
| 6,612,492 B1 | * | 9/2003 | Yen ............................. | 235/451 |
| 6,641,413 B2 | * | 11/2003 | Kuroda ........................ | 439/159 |
| 6,672,904 B1 | * | 1/2004 | Chen ........................... | 439/631 |
| 6,699,053 B2 | * | 3/2004 | Kuroda ........................ | 439/218 |
| 6,700,788 B2 | * | 3/2004 | Matsushita et al. ......... | 361/737 |
| 2001/0036770 A1 | * | 11/2001 | Saito et al. .................. | 439/630 |
| 2001/0039129 A1 | * | 11/2001 | Nishimura ................... | 439/74 |
| 2002/0025726 A1 | * | 2/2002 | Nishimura .................. | 439/625 |
| 2002/0045375 A1 | * | 4/2002 | Suzki .......................... | 439/326 |
| 2002/0065001 A1 | * | 5/2002 | Sun ............................. | 439/630 |
| 2003/0098346 A1 | * | 5/2003 | Chen et al. ................. | 235/441 |
| 2004/0043664 A1 | * | 3/2004 | Sato et al. ................... | 439/630 |

* cited by examiner

*Primary Examiner*—Ross Gushi
(74) *Attorney, Agent, or Firm*—Bacon & Thomas PLLC

(57) ABSTRACT

The 5-in-1 connector of the present invention has a cartridge with three insertion slots which each is provided fixedly with a contact pin set correspondingly connecting with circuit contact points of one of various memory cards, thereby an electric device can be inserted therein with at least three memory cards of different specifications; the first of the three insertion slots can afford insertion of one of CF and MD memory cards, the second insertion slot can afford insertion of one of SD and MMC memory cards, the third insertion slot can afford insertion of an MS memory card, hence the electric device at least can proceed to reading and writing on five memory cards of different specifications.

3 Claims, 3 Drawing Sheets

5-IN-1 CONNECTOR

BACKGROUND OF THE INVENTION

1. Field of the Invention

The present invention is related to a 5-in-1 connector, and especially to a 5-in-1 connector to render an electric device to execute data reading, exchanging and transferring with memory cards of five specifications including those of CF memory cards (CompactFlash cards), MD memory cards (Micro Drive Cards), MMC memory cards (MultiMedia Cards), MS memory cards (Memory Stick Cards) and SD memory cards (Secure Digital Cards) on the connector.

2. Description of the Prior Art

Generally, a main body of a 3C digital electric device such as a notebook, a digital camera, a digital video camera, a PDA and a personal computer etc. partly is built therein with a connector at least specific for a set of specifications in addition to providing those necessary input and output ports (such as a USB port) for peripheral devices, and an insertion slot is provided for a flash memory card to allow drawing out of it for changing in time to increase its capability of storage of data and convenience of data exchanging, reading and writing; however, specifications of memory cards in the markets are too many that the electric device is required to be built therein with a connector meeting various specifications, thereby, the insertion slot of the connector can afford insertion of the memory cards to make connection and data exchange of the memory cards with the electronic circuit of the electric device.

However, digital electric devices carried on ones' person such as a notebook or a PDA etc. not only are continuously elevated in their functions, but also are designed aiming at the direction of lightening weight in order to meet the feature of being convenient for carrying and receiving. Thereby, the built-in connector preferably not occupies too much space of an electric device; and some manufacturers even do not allow to build in connectors corresponding to memory cards of non-specific specifications to avoid the connectors not in use to occupy spaces in need.

Therefore, there have been developed one-for-plurality card readers specific for memory cards of various specifications in the markets to afford connection and use of 3C electric devices with memory cards of non-specific specifications, this can elevate the function of connection of the 3C electric devices with the memory cards. However, the constructions of the one-for-plurality card readers sold in the markets can be regarded each as a main body of a device connecting with plural connectors (for example, a 6-in-one card reader needs 6 connectors), costs of them are high, and they are cumbersome in assembling and has a larger volume, they do not suit digital electric devices carried on ones' person such as a notebook or a PDA etc.

SUMMARY OF THE INVENTION

The 5-in-1 connector of the present invention has a cartridge with three insertion slots which each is provided fixedly with a contact pin set correspondingly connecting with circuit contact points of one of various memory cards, the contact pin sets are extended toward the bottom and the rear sides of the cartridge to connect and fix to the electronic circuit of an electric device, thereby the electric device can be inserted therein with at least three memory cards of different specifications; the first of the three insertion slots can afford insertion of one of CF, MD memory cards, the second insertion slot can afford insertion of one of SD, MMC memory cards, the third insertion slot can afford insertion of an MS memory card, hence the electric device at least can proceed to reading and writing on five memory cards of different specifications.

In which the insertion slots of the cartridge are divided into: the first insertion slot located at a lower layer as well as the second and third insertion slots that are located in juxtaposition with each other above the first insertion slot. The first insertion slot is common to the CF, MD memory cards with closely similar sizes to it, and is provided internally thereof with a channel mating with the width and thickness of either of the CF, MD memory cards to prevent wrong insertion of memory cards; the second insertion slot is common to the SD, MMC memory cards with closely similar sizes to it, and is provided internally thereof with a channel mating with the width and thickness of either of the SD, MMC memory cards to prevent wrong insertion of memory cards; while the third insertion slot is of the construction meeting the MS memory card; so that the entire space arrangement of the insertion slots of the electric device can be reduced to the most simplified degree without occupying too mush space of the electric device, and the three memory cards of different specifications can be simultaneously inserted therein.

The present invention will be apparent in its structural combination and the entire mode of operation thereof after reading the detailed description of the preferred embodiment thereof in reference to the accompanying drawings.

DETAILED DESCRIPTION OF THE PREFERRED EMBODIMENT

Figure 1:
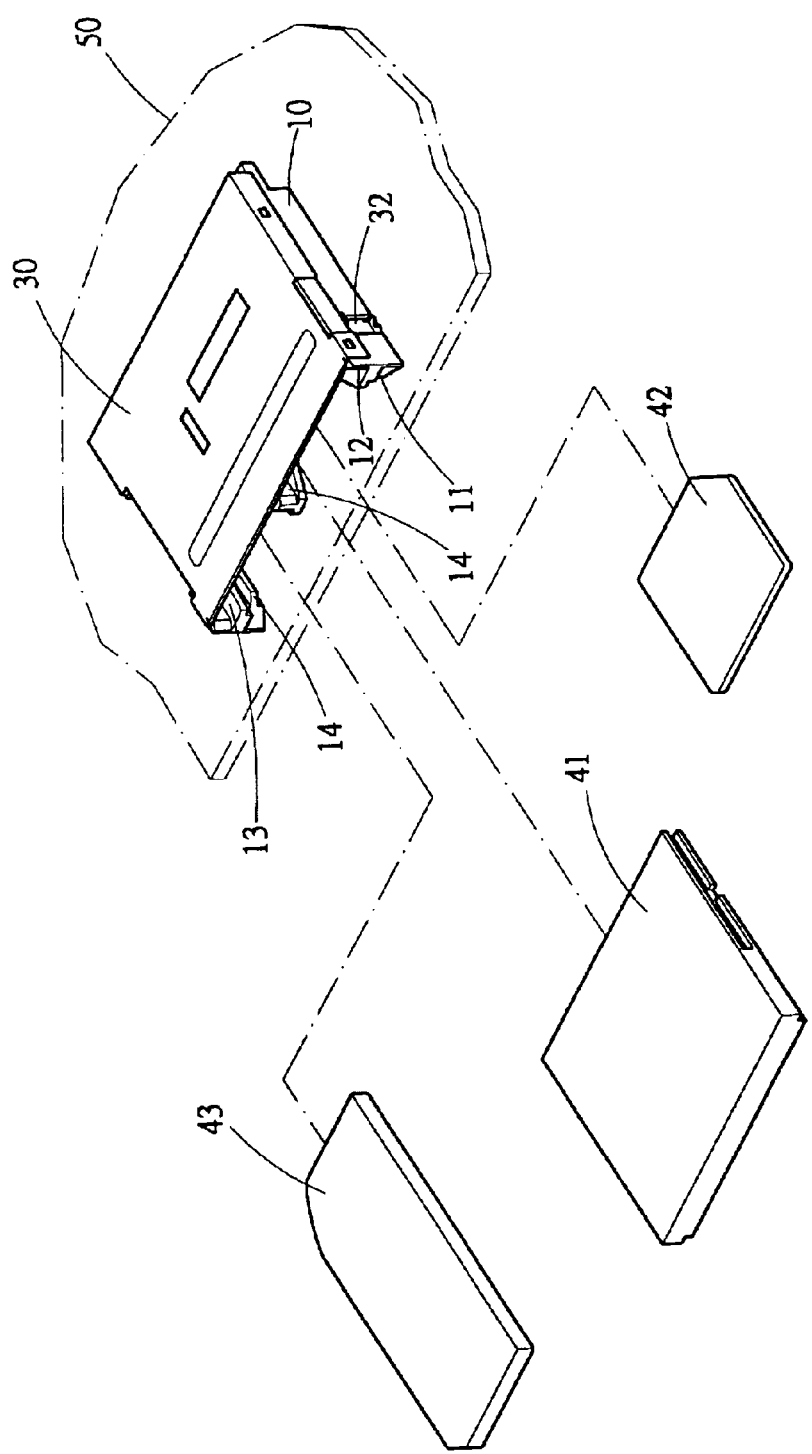
FIG. 1 is a schematic perspective view showing the apparent structure of the connector of the present invention and the state of connection of the connector with memory cards.
Figure 2:
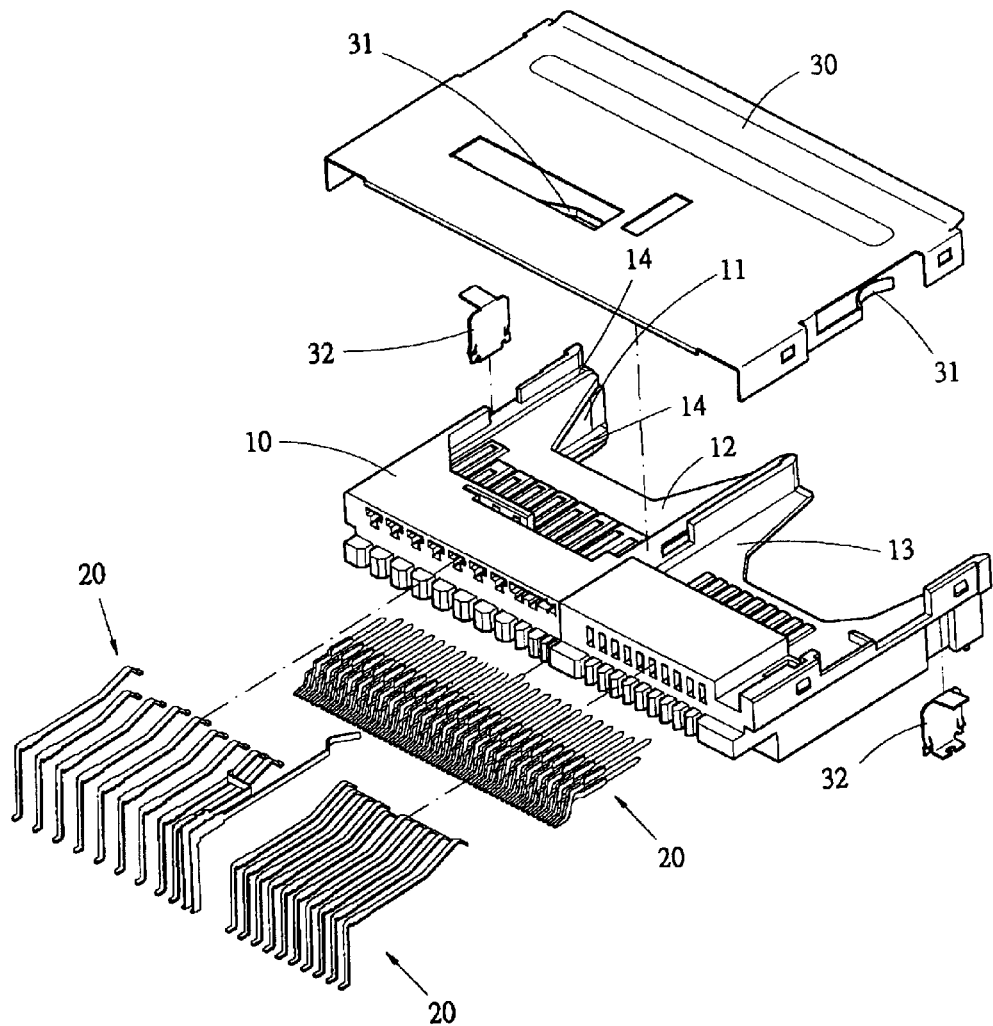
FIG. 2 is an analytic perspective view showing the structure of the connector of the present invention.

The entire structure combination of the 5-in-1 of the connector of the present invention is as shown in FIGS. 1 and 2, it takes a cartridge 10 made of plastic as a main body; the cartridge 10 is provided on the front side thereof with an insertion slot in coincidence with any of the memory cards of five specifications including those of CF, MD, MMC, MS and SD memory cards. In the embodiment as shown in drawings, the entire cartridge 10 is provided with three insertion slots which include a first insertion slot 11 as well as a second insertion slot 12 and a third insertion slot 13 located in juxtaposition with each other above the first insertion slot 11.

Wherein the first insertion slot 11 is common to a CF memory card 41 and an MD memory card (not shown) with closely similar sizes to it but with slightly different thickness, and is provided internally thereof with a channel 14 mating with the length, width and thickness of either of the CF memory card 41 and the MD memory card (not shown) to prevent wrong insertion of memory cards; the second insertion slot 12 is common to an SD memory card 42 and an MMC memory card (not shown) with closely similar sizes to it, but with slightly different length, and is provided internally thereof with a channel 14 mating with the length, width and thickness of either of the SD memory card and the MMC memory card (not shown) to prevent wrong insertion of memory cards. While the third insertion slot 13 is of the construction meeting an MS memory card 43, so that the entire space arrangement of the insertion slots of the electric device can be reduced to the most simplified degree without occupying too much space of the electric device.

Figure 3:
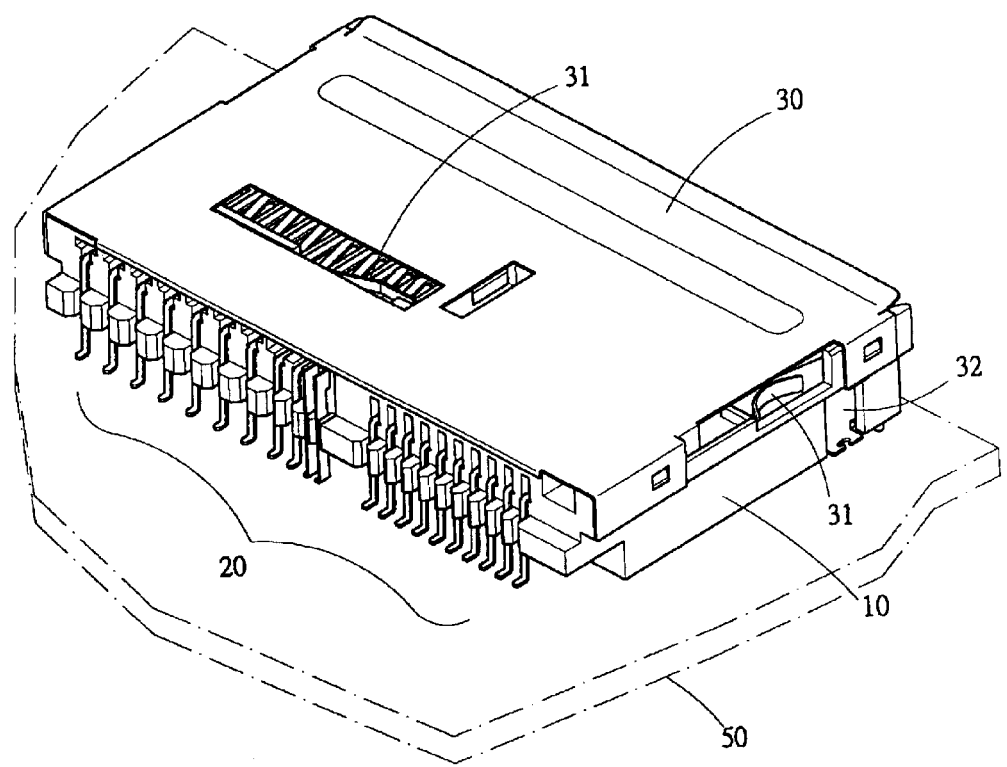
FIG. 3 is a schematic perspective view showing allocation of contact pin sets of the connector of the present invention.

As shown in FIGS. 2 and 3, the first, second and third insertion slots 11, 12, 13 of the cartridge 10 are provided fixedly with contact pin sets 20 correspondingly connecting with circuit contact points of the memory cards, the contact pin sets 20 are extended toward the bottom and the rear sides of the cartridge 10 to render the insertion slots 11, 12, 13 to connect by welding and fix to an electronic circuit 50 of the electric device via the contact pin sets 20, thereby the electric device can proceed to reading and writing on at least the above stated CF, MD, MMC, MS and SD memory cards to largely increase the convenience of use and applicability in connecting and use of the electric device with the memory cards.

Particularly, the entire electric device has the first insertion slot 11, the second insertion slot 12 and the third insertion slot 13 connecting with the electronic circuit 50 of the electric device via the contact pin sets 20, so that the first, second and third insertion slots 11, 12, 13 can be regarded as three independent connectors to render the electric device to have three kinds of swappable hardware for data storage occupying only a space affording conventionally only one connector, in favor of operation of an IC of the electronic circuit 50 in controlling the first, second and third insertion slots 11, 12, 13, thereby the electric device can execute data exchanging, reading and writing simultaneously on the memory cards inserted in the first, second and third insertion slots 11, 12, 13, or execute data exchanging and storing among the first, second and third insertion slots 11, 12, 13.

For example, the electric device mounted with the connector of the present invention is a notebook, and the first insertion slot 11 is inserted therein with an CF memory card, the second insertion slot 12 is inserted therein with an SD memory card, the third insertion slot 13 is inserted therein with an MS memory card, then the notebook can execute data exchanging, reading and writing simultaneously on the CF memory card, the SD memory card and the MS memory card, or execute mutual data exchanging and storing among the CF memory card, the SD memory card and the MS memory card.

Moreover, the entire connector is further provided on the cartridge 10 with a metallic lid 30 which is connected with the electronic circuit 50 and a grounding piece 32 to get an effect of grounding; the metallic lid 30 is further provided on its top and lateral sides in corresponding respectively to those of the cartridge 10 each with an elastic contact sheet 31, positioning and connecting of memory cards can be acquired by means of these elastic contact sheet 31; and in connecting of the memory cards with the electronic circuit 50, a shielding function against electromagnetic interference (EMI) can be attained through grounding of the metallic lid 30.

The 5-in-1 connector of the present invention provides another better practical structure of connector for 3C electric device. The description and drawings are only for illustrating a preferred embodiment of the present invention, and not for giving any limitation to the scope of the present invention. It will be apparent to those skilled in this art that various modifications or changes without departing from the spirit, scope and characteristic of this invention shall also fall within the scope of the appended claims of the present invention.

Having thus described my invention, what I claim as new and desire to be secured by Letters Patent of the United States are:

1. A 5-in-1 connector, said connector comprises: a cartridge made of plastic as a main body; said cartridge is provided with three insertion slots which include a first insertion slot located at a lower layer as well as a second insertion slot and a third insertion slot located in juxtaposition with each other above said first insertion slot, wherein:

said first insertion slot is common to CF and MD memory cards, and is provided internally thereof with a channel mating in width and thickness with either of said CF and MD memory cards to prevent wrong insertion of memory cards;

said second insertion slot is common to the SD and MMC memory cards, and is provided internally thereof with a channel mating in width and thickness with either of said SD and MMC memory cards to prevent wrong insertion of memory cards;

while said third insertion slot is of the construction meeting an MS memory card;

said insertion slots each is provided fixedly with a contact pin set correspondingly connecting with circuit contact points of one of various memory cards, said contact pin sets are extended toward a bottom and a rear side of said cartridge to connect and fix to an electronic circuit of an electric device, thereby said electric device at least is adapted to executing reading and writing on five memory cards of different specifications and being inserted therein with three memory cards of different specifications.

2. The 5-in-1 connector as in claim 1, wherein said cartridge is provided thereon with a metallic lid which is connected with said electronic circuit and a grounding piece to get an effect of grounding.

3. The 5-in-1 connector as in claim 1, wherein said cartridge is provided on its top and lateral sides each with an elastic contact sheet; positioning and connecting of memory cards are acquired by using of said elastic contact sheet.

* * * * *